United States Patent [19]

Kaplan et al.

[11] Patent Number: 4,518,770
[45] Date of Patent: May 21, 1985

[54] PROCESS FOR THE PREPARATION OF POLYHYDROXYBUTADIENES

[75] Inventors: Steven E. Kaplan, Houston; Richard C. Frink, Baytown, both of Tex.

[73] Assignee: Atlantic Richfield Company, Los Angeles, Calif.

[21] Appl. No.: 574,801

[22] Filed: Jan. 30, 1984

[51] Int. Cl.$^3$ .................. C08F 2/16; C08F 136/04
[52] U.S. Cl. .................. 528/487; 526/67; 526/212; 526/229; 526/340.1
[58] Field of Search .................. 528/487

[56] References Cited

U.S. PATENT DOCUMENTS 3,658,774 4/1972 Liu .................. 528/487

FOREIGN PATENT DOCUMENTS 103207 8/1981 Japan .................. 528/487

Primary Examiner—Christopher A. Henderson, Jr.
Attorney, Agent, or Firm—Delbert E. McCaslin

[57] ABSTRACT

An improved process is provided for the preparation of polyhydroxybutadienes (hydroxy-containing butadiene homopolymers) which comprises injecting an aqueous solution of alkali metal sulfite or bisulfite into the polyhydroxybutadiene solvent recovery section to prevent fouling.

9 Claims, 1 Drawing Figure

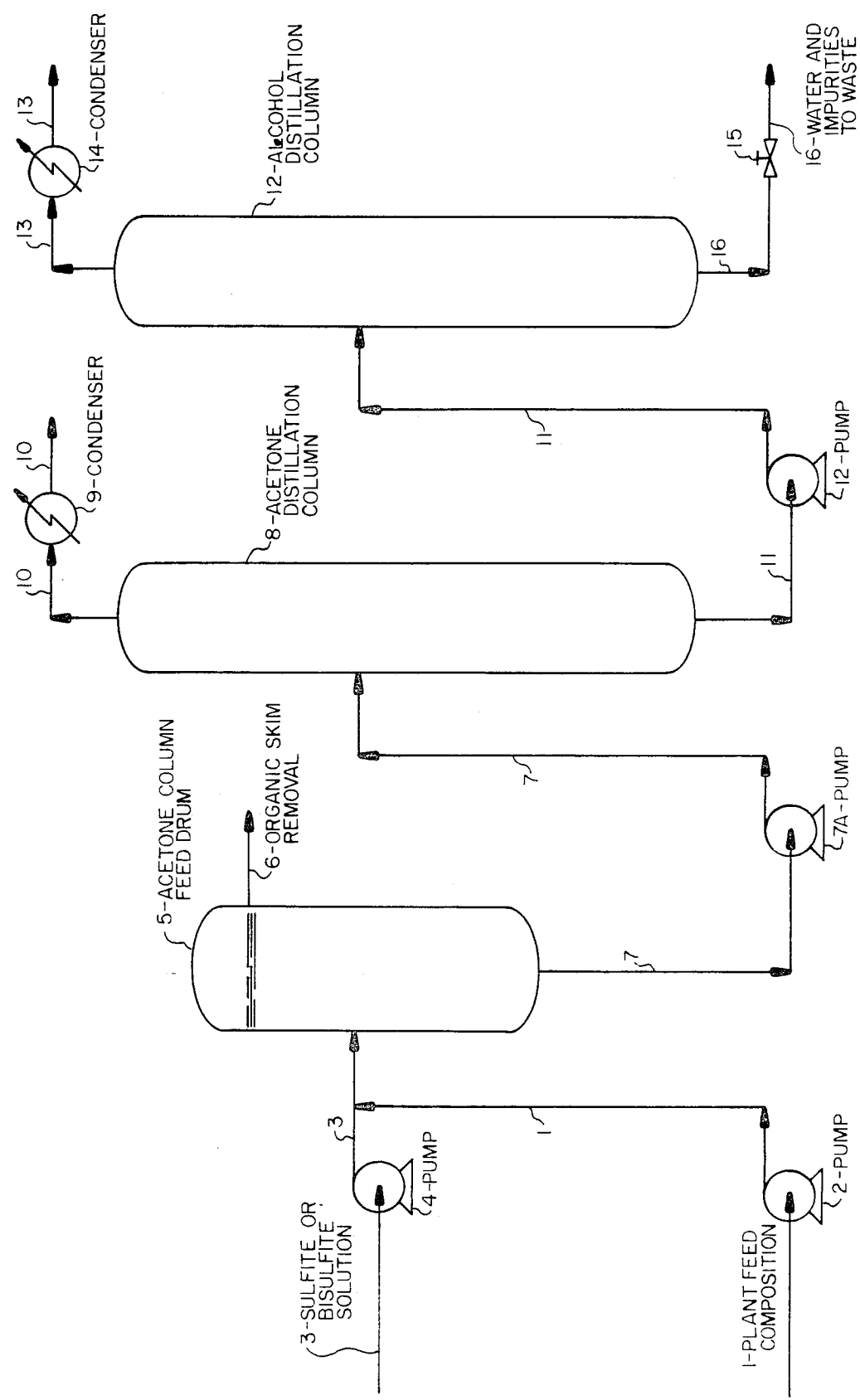

PROCESS FOR THE PREPARATION OF POLYHYDROXYBUTADIENES

BACKGROUND OF THE INVENTION

This invention relates to an improvement in the preparation of polyhydroxybutadiene (hydroxyl-containing polymers) with number average molecular weight in the range of 400 to 25,000. More specifically, the invention concerns the introduction of an aqueous solution of alkali metal sulfite or bisulfite into the polyhydroxybutadiene solvent recovery section during the preparation of polyhydroxybutadienes to prevent fouling of the acetone recovery distillation column and the azeotroping alcohol distillation column employed to recover and recycle solvent alcohol to the polyhydroxybutadiene reactors.

Processes for the preparation of polyhydroxybutadienes (hydroxy-containing butadiene homopolymers) are known in the art, and may be prepared, for example, by the methods described in U.S. Pat. Nos. 3,333,015, 3,673,168, and 3,796,762, all incorporated herein by reference.

In the preparation of polybutadiene, a solvent recovery section or unit is employed to remove the alcohol, such as isopropyl alcohol, acetone, other organics and hydrogen peroxide ($H_2O_2$) from unreacted butadiene after removal of essentially all of the polybutadiene product. The Acetone is removed in a sieve tray distillation column and purged to waste or used as fuel. The alcohol is distilled in an azeotroping distillation column and recycled, along with some water to the reactors for reuse in the polymerization process.

A problem has existed in the polybutadiene solvent recovery unit wherein due to solids formation below the feed trays of the distillation columns, fouling occurs which plugs the trays and downcomers. The fouling is apparently caused by the presence of hydrogen peroxide, low molecular weight polybutadienes, polymeric precursors such as butadiene and vinylcyclohexene formed by the polymerization reaction. Such fouling occurres approximately every 5 to 6 days at high plant production rates thus requiring frequent and expensive shutdowns for cleaning.

The present invention of introducing a feed of aqueous alkali metal sulfite or bisulfite into the solvent recovery section provides for control of fouling of the distillation columns representing a significant improvement in the process.

Applicants are not aware of any truly pertinent prior art that is deemed to be anticipatory or suggestive of the concept of the present invention.

SUMMARY OF THE INVENTION

This invention relates to a method for the prevention of fouling of the distillation columns in the solvent recovery section of a polyhydroxybutadiene reaction system and involves the introduction of an aqueous solution of an alkali metal sulfite or bisulfite into the plant feed composition to the solvent recovery unit, said composition comprising unreacted butadiene, solvent alcohol (generally isopropyl alcohol), hydrogen peroxide, water, vinylcyclohexene, acetone and traces of polybutadiene polymer.

It is the primary object of this invention to provide an improved method for the preparation of polyhydroxybutadienes.

It is another object of this invention to provide a novel method for the prevention of fouling of the solvent recovery distillation columns employed in the preparation of polyhydroxybutadiene.

These and other objects and advantages of this invention will become apparent from the description of the invention which follows, and from the claims.

BRIEF DESCRIPTION OF THE DRAWING

The figure is a schematic diagram of a specific flow system which can be used to carry out the method of this invention.

DETAILED DESCRIPTION OF THE INVENTION AND DRAWING

In accordance with this invention an improved process for the preparation of polyhydroxybutadiene is provided whereby fouling of the distillation columns employed in the solvent recovery section of the polyhydroxybutadiene process is essentially prevented. It has been discovered that the injection of from about a 0.05 to 20 weight percent alkali metal sulfite or bisulfite aqueous solution at a rate of about 0.05 to 10 gallons per minute or higher depending on the particular size of the solvent feed recovery section employed controls said fouling.

The polyhydroxybutadiene homopolymers (also referred to hereinafter as Polybutadiene) prepared by the process of the present invention will have a viscosity range of from about 20 to 300 or up to about 550 poises at 30° C. Preferably the homopolymers have a viscosity of about 35 to 60 or up to about 190 to 260 poises. Thus, the polyhydroxybutadiene homopolymers are liquid or semi-solids flowable, at least when subjected to moderate pressure, at ambient temperatures or at temperatures up to about 200° C. The hydroxyl-containing butadiene homopolymers will have molecular weights in the range of about 400 to 25,000 or higher as determined by cryoscopic, ebullioscopic or osomometric methods.

The polyhydroxybutadiene (hydroxy-containing butadiene homopolymers) prepared by the process of this invention differ from diene polymers known to be telechelic and/or hydroxy-containing in that the majority of unsaturation in the former is in the main hydrocarbon chain and in that the hydroxy components are in predominantly terminal positions on the main hydrocarbon chain and are predominantly primary and allylic in configuration. Ordinarily, at least about 1.8, often at least about 2 or more, frequently 2.1 to 2.8 and up to about 3 or more hydroxyl groups are present on the average per polymer molecule. Since these hydroxyl groups are predominantly primary, terminal and allylic in structure, with approximately two of the hydroxyl groups being at terminating positions on the main carbon chain, the polymers are highly reactive.

The dienes which are employed to make the polyhydroxybutadienes include the unsubstituted, 2-substituted or 2,3-disubstituted 1,3-dienes of 4 up to about 12 carbon atoms. The diene preferably has up to 6 carbon atoms and the substituents in the 2- and/or 3-position may be hydrogen, alkyl, generally lower alkyl, e.g., of 1 to 4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, 2-phenyl-1,3-butadiene, 2-methyl-3-phenyl-1,3-butadiene, etc. The choice of diene will usually depend upon properties desired in the final elastomer.

Although polyhydroxybutadienes of the above-described type, averaging more than one predominantly primary hydroxyl per molecule, say about 1.8 to 3 or more per molecule, may be prepared by the process of this invention, they preferably have an average of at least 2 or more or about 2.1 to 2.4 up to 2.8 hydroxyl groups per molecule and the hydroxyl groups are predominantly in terminal allylic positions on the main, generally longest, hydrocarbon chain of the molecule. By "allylic" configuration is meant the alpha-allylic grouping of allylic alcohol; that is, the terminal hydroxyls of the intermediate polymer are attached to a carbon adjacent to a double-bond carbon.

The ratio of cis-1,4 and trans-1,4 and 1,2-vinyl unsaturation which occurs in the diene polymers prepared by this invention, the number and location of the hydroxyl groups and the molecular weight of the polymers can be a function of polymerization temperature and the type of addition polymerization system employed in forming the polymer. It has been found that diene polymers of the desired configuration can be obtained using hydrogen peroxide as the catalyst for polymerization in a mutual solvent system. This free-radical addition polymerization usually takes place in solution at a temperature above about 100° C. to 200° C.

The reaction preferably takes place in a mutual solvent system; that is, one which dissolves both the diene monomer and the hydrogen peroxide. Suitable solvents include isopropanol, methanol, sec-butanol, acetone, n-butanol, n-propanol, methyl ethyl ketone and the like, saturated alcohols or ketones preferably alkanols, having 2 to about 12 carbon atoms. The $H_2O_2$—solvent system is found to supply hydroxyl groups and the catalytic and solvent effects needed to produce the diene polymers of desired chemical and physical characteristics. In such a polymerization system the alcohol or ketone serves as a solvent for the peroxide and as a solvent or diluent for the diene monomer and is used in an amount suitable to promote adequately rapid but controllable polymerization of the monomer material in the solution to form the diene polymers. The solvent will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$--solvent system may also contain ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 percent to 15 percent of the reaction mixture to assure a low molecular weight addition polymer product having more than two hydroxyl groups per molecule.

In the polybutadiene process a solvent recovery section is employed to reclaim and recycle the alcohol, such as isopropanol, to the polybutadiene reactors after removal of essentially all of the polybutadiene product. The solvent recovery section has two major functions, i.e., (1) to remove the alcohol and hydrogen peroxide catalyst from the unreacted butadiene and (2) to re-concentrate the solvent alcohol for reuse in the polybutadiene reactors. The solvent recovery section also removes acetone and vinylcyclohexene produced as by-products in the reactors. The feed composition to the solvent recovery section consists essentially of between about 0.01 to 0.10% by weight butadiene, 10 to 15% by weight isopropyl or other alcohol, 1 to 2% by weight hydorgen peroxide, 80 to 85% by weight water, 0.20 to 0.60% by weight vinylcyclohexene dimer, 0.05 to 0.20% by weight acetone and a trace (generally less than 1/10 of 1%) of polybutadiene product.

In order to discribe the invention in greater detail reference is made to the drawing wherein a feed composition from the polybutadiene plant at a temperature of about 52° C. is fed via line 1 through pump 2 to line 3 while at the same time an alkali metal sulfite or bisulfite solution at ambient temperature is fed via line 3 through pump 4 and the mixed plant feed composition and sulfite or bisulfite sulution entering via line 3 and being collected in acetone column feed drum 5 where the organic upper skim is removed via line 6. The plant feed composition and alkali metal sulfite or bisulfite solution is then fed to the acetone distillation column 8 from the bottom of feed drum 5 via line 7 and pump 7A and is at a temperature of about 43° C. The acetone distillation column 8 operating at an overhead temperature of about 74° C. and a bottoms temperature of about 88° C. removes acetone, some alcohol, vinylcyclohexene and water overhead via line 10 and condenser 9, the acetone being purged to fuel. The bottoms from the acetone distillation column 8 is fed to the alcohol distillation column 12, via line 11 through pump 12. The alcohol distillation column 12 operating at an overhead temperature of about 80° C. and a bottoms temperature of about 96° C. recovers the alcohol solvent overhead via line 13 and condenser 14 for recycle to the polyhydroxybutadiene reactors. Used sulfite or bisulfite water and hydrogen peroxide exits the bottom of alcohol distillation column 12 via valve 15 through line 16 for discharge to a process sewer waste water settling system.

Although the method of the present invention will be directed principally to the prevention of fouling of the solvent recovery system of a polyhydroxybutadiene plant using sodium sulfite and bisulfite and potassium sulfite it is not intended that the method be limited to the use of such sulfite or bisulfite and those skilled in the art will recognize that the present method is broadly applicable to the use of alkali metal sulfites and bisulfites such as potassium bisulfite and lithium sulfite and bisulfite, etc.

The following examples are provided to illustrate the invention in accordance with the principles of this invention but are not to be construed as limiting the invention in any way except as indicated by the appended claims.

EXAMPLE 1

A 17 weight percent aqueous solution (saturated solution) of sodium sulfite was injected at a rate of 2.3 gallons per minute (gpm) for 14 days, 1.1 gpm for 20 days, 0.55 gpm for 33 days and 0.23 gpm for 11 days into the solvent recovery section of a polyhydroxybutadiene plant along with a feed composition from the plant containing approximately 0.03 weight % butadiene, 15.27 weight % isopropyl alcohol, 1.24 weight % hydrogen peroxide, 82.70 weight % water, 0.57 weight % vinylcyclohexene, 0.18 weight % acetone and 0.01 weight % polyhydroxybutadiene polymer. The acetone and alcohol distillation columns were inspected after each of the sodium sulfite injections and were found to be exceptionally clean as compared to fouling of the units after 5 to 6 days without sodium sulfite injection.

Inspection of the units after the 0.23 gpm injection rate period showed a very slight buildup in the bottom four downcomers and bottoms lines of the alcohol distillation column. Alcohol losses in the alcohol distillation bottom was greatly reduced with the sodium sulfite injection.

EXAMPLE 2

A 10 weight percent aqueous solution of sodium bisulfite is employed along with the polyhydroxybutadiene plant feed composition to the solvent recovery section as set forth in Example 1. Inspection of the acetone and alcohol distillation columns show that essentially no fouling of the units occur.

EXAMPLE 3

Example 1 is repeated using a 10 weight percent aqueous solution of a potassium sulfite with essentially no fouling occurring in the distillation columns after the total periods of injection.

We claim:

1. In a process for the preparation of a polyhydroxybutadiene homopolymer wherein a diene monomer is polymerized in the presence of hydrogen peroxide catalyst and an alcohol solvent, said process including the recovery in a distillation unit of said alcohol solvent from a feed stream comprising unreacted butadiene, alcohol, hydrogen peroxide, water, acetone and vinylcyclohexene after preparation and recovery of polyhydroxybutadiene product, the improvement for reducing fouling of said distillation unit which comprises injecting into the distillation unit, along with said feed stream from which the polyhydroxybutadiene has been essentially removed, an aqueous solution of an alkali metal sulfite or bisulfite.

2. A process according to claim 1 wherein the alcohol is isopropyl alcohol.

3. A process according to claim 1 wherein the alkali metal sulfite solution is sodium sulfite.

4. A process according to claim 1 wherein the alkali metal bisulfite solution is sodium bisulfite.

5. A process according to claim 1 wherein the alkali metal sulfite solution is potassium sulfite.

6. A process according to claim 1 wherein between about a 0.05 to 20 weight percent alkali metal sulfite or bisulfite aqueous solution is injected into the distillation unit.

7. A process according to claim 6 wherein a 17 weight percent sodium sulfite solution is injected.

8. A process according to claim 1 wherein between 0.5 and 10 gallons per minute aqueous alkali metal sulfite or bisulfite solution is injected based on the size of the distillation unit.

9. In a process for the preparation of a polyhydroxybutadiene homopolymer wherein 1,3-butadiene is polymerized in the presence of hydrogen peroxide catalyst and an isopropyl alcohol solvent, said process including the recovery in a distillation unit of said isopropyl alcohol from a feed stream comprising unreacted butadiene, isopropyl alcohol, hydrogen peroxide, water, acetone and vinylcyclohexene after preparation and recovery of the polyhydroxybutadiene, the improvement for reducing fouling of said distillation unit which comprises injecting into the distillation unit, along with said feed stream from which-the-polyhydroxybutadiene has been essentially removed, an aqueous solution of an alkali metal sulfite or bisulfite.

* * * * *